United States Patent
Senno et al.

(10) Patent No.: US 12,220,885 B2
(45) Date of Patent: Feb. 11, 2025

(54) METHOD OF REPAIRING TIRE AND REPAIRED TIRE

(71) Applicant: BRIDGESTONE CORPORATION, Tokyo (JP)

(72) Inventors: Yoshikazu Senno, Tokyo (JP); Takahiro Miura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 202 days.

(21) Appl. No.: 17/786,783

(22) PCT Filed: Dec. 8, 2020

(86) PCT No.: PCT/JP2020/045564
§ 371 (c)(1),
(2) Date: Jun. 17, 2022

(87) PCT Pub. No.: WO2021/124965
PCT Pub. Date: Jun. 24, 2021

(65) Prior Publication Data
US 2023/0022382 A1 Jan. 26, 2023

(30) Foreign Application Priority Data
Dec. 18, 2019 (JP) .................. 2019-227904

(51) Int. Cl.
*B29C 73/02* (2006.01)
(52) U.S. Cl.
CPC .................. *B29C 73/025* (2013.01)
(58) Field of Classification Search
None
See application file for complete search history.

(56) References Cited

U.S. PATENT DOCUMENTS

| | | | |
|---|---|---|---|
| 8,784,588 B2 | 7/2014 | Colby et al. | |
| 2009/0229737 A1 | 9/2009 | Fujiwara et al. | |

FOREIGN PATENT DOCUMENTS

| | | |
|---|---|---|
| JP | 2013-141821 A | 7/2013 |
| JP | 2015-168127 A | 9/2015 |
| JP | 2015-168167 A | 9/2015 |
| JP | 2015-205493 A | 11/2015 |

OTHER PUBLICATIONS

Machine English translation of JP2015168127, Accessed Mar. 14, 24 (Year: 2015).*
International Search Report of PCT/JP2020/045564 dated Feb. 2, 2021 [PCT/ISA/210].
RM-5 Tech Repair Manual, "Two-Piece Puncture Repair Method For Passenger, Light Truck & Truck Tires", Tech, 2019, pp. 1-10 (12 pages total).

* cited by examiner

*Primary Examiner* — Jacob T Minskey
*Assistant Examiner* — Adrianna N Konves
(74) *Attorney, Agent, or Firm* — Sughrue Mion, PLLC

(57) ABSTRACT

A method of repairing a tire is a method to repair a damaged part of the tire, the damaged part being a part in a rubber layer of a tire side section located between a carcass ply and a tire surface and terminated within the rubber layer. The method of repairing the tire includes: a first step of opening the damaged part while in a state the tire is retained; a second step of injecting or applying an adhesive to the damaged part; a third step of releasing a damaged-part-opened state and bonding mutually opposing wall surfaces of the damaged part.

7 Claims, 3 Drawing Sheets

METHOD OF REPAIRING TIRE AND REPAIRED TIRE

CROSS REFERENCE TO RELATED APPLICATIONS

This application is a National Stage of International Application No. PCT/JP2020/045564, filed Dec. 8, 2020, claiming priority to Japanese Patent Application No. 2019-227904, filed Dec. 18, 2019.

TECHNICAL FIELD

The present invention is directed to a method of repairing a damaged part of a tire and a repaired tire.

BACKGROUND ART

A method of repairing a tire applicable to a tire in which a region from a shoulder section to a sidewall section of the tire is damaged is described in patent literature 1.

In this method, a damaged part is removed, then a patch reinforcing material is attached to the damaged part to reinforce the part, and then a recess formed by removing the damaged part is filled up to the tire surface with a filler or the like to repair the damaged part of the tire.

CITATION LIST

Patent Literature

Patent Literature 1: U.S. Pat. No. 8,784,588

SUMMARY OF INVENTION

Technical Problem

In such a method of repairing a tire, the damaged part of the tire, the damaged part including a carcass cord or the like that reinforces the tire, is removed and, accordingly, an opening part is formed in the tire, then the opening part is repaired by a repairing member. Therefore, in the conventional method of repairing a tire, the tire is removed from a vehicle and is repaired after the damaged part of the tire reached to the carcass cord.

However, when the tire is repaired after the damaged part has reached to the carcass cord, the tire may be in a state that the tire is difficult to repair, and the life of the tire may be shortened.

An object of the present invention is to provide a method of repairing a tire by which a damaged part in a rubber layer positioned between a carcass ply and a tire surface in a tire side section of the tire may be easily repaired and a life of the tire may be extended, and to provide a tire repaired by the method.

Solution to Problem

A method of repairing a tire according to one or more embodiments of the present invention is a method in which a damaged part, the damaged part being a part in a rubber layer of a tire side section located between a carcass ply and a tire surface and terminated within the rubber layer, is repaired. The method of repairing the tire includes a first step of opening the damaged part while in a state the tire is retained, a second step of injecting or applying an adhesive to the damaged part, and a third step of releasing a damaged-part-opened state and bonding mutually opposing wall surfaces of the damaged part.

A repaired tire according to one or more embodiments of the present invention includes a carcass ply being a framework of the tire, and a rubber layer contacting an outer side in a tire width direction of the carcass ply at the tire side section and forming a tire surface. The rubber layer includes a repaired part, the repaired part being a part where a damaged part terminated within the rubber layer is bonded and repaired with an adhesive.

Advantageous Effects

According to the respective configurations, the method of repairing a tire that provides a tire repairing method by which the damaged part in the rubber layer positioned between the carcass ply and the tire surface in the tire side section of the tire may be easily repaired and a life of the tire may be extended, and the tire repaired by the method.

DESCRIPTION OF EMBODIMENTS

Embodiments will be described below with reference to the drawings. It should be noted that the same functions and configurations are denoted by the same or similar reference signs, and the description thereof is appropriately omitted.

Figure 1A:
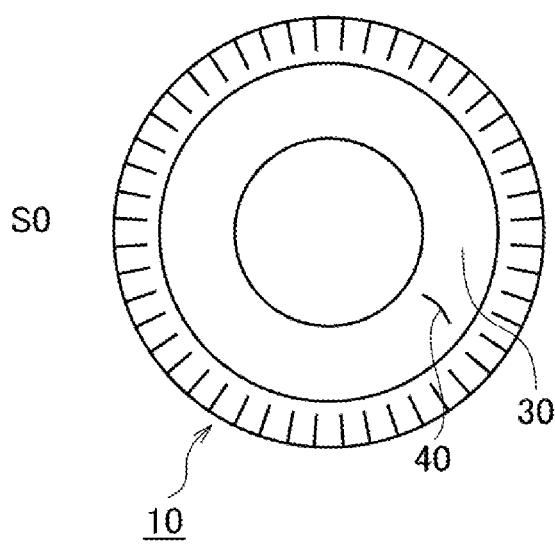
FIG. 1(a) is a schematic drawing of a tire 10 according to an embodiment illustrating a view from a tire axial direction, and is a drawing illustrating the tire 10 having a damaged part 40 before being repaired.
Figure 1B:
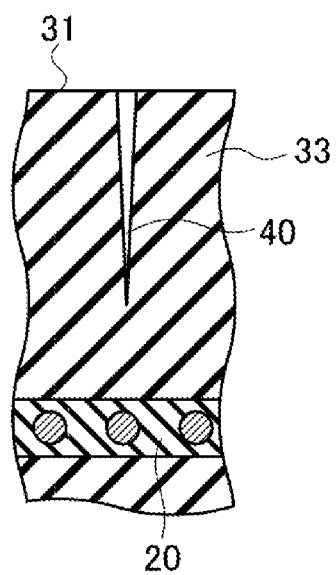
FIG. 1(b) is an enlarged cross-sectional view of a part of the tire 10 having the damaged part 40 before being repaired in FIG. 1(a).

FIG. 1(a) is a schematic drawing of a tire 10 according to one or more embodiments illustrating a view from the tire axial direction, and is a drawing illustrating the tire 10 having a damaged part 40 before being repaired. FIG. 1(b) is an enlarged cross-sectional view of a part of the tire 10 having the damaged part 40 before being repaired in FIG. 1(a).

The one or more embodiments provide a method of repairing a damaged part of a tire and a tire repaired by the repairing method.

The method of repairing a tire according to the present embodiment is applicable to the tire 10 including, for example, a carcass ply 20 being a framework of the tire 10 and a rubber layer 33 contacting an outer side in a tire width direction of the carcass ply 20 at a tire side section 30 and forming a tire surface 31. In particular, the method is applicable to the damaged part 40 terminated within the rubber layer 33.

The method of repairing the tire includes a first step S10 of opening the damaged part 40 while in a state the tire 10 is retained, a second step S20 of injecting or applying an adhesive 60 to the damaged part 40, and a third step S30 of releasing a opened state of the damaged part 40 and bonding mutually opposing wall surfaces of the damaged part 40.

It should be noted that the method of repairing the tire according to the present embodiment is particularly suitably applied to a heavy load tire such as a tire for a mining vehicle in which a crack such as a cut scratch is likely to occur in the tire side section 30 by a sharp stone or the like when traveling on a uneven terrain.

FIG. 1(a) illustrates a state S0 of the tire 10 having the damaged part 40 before being repaired. In FIG. 1(a), the damaged part 40 is in the tire side section 30. Specifically, the damaged part 40 is illustrated to be narrow, that is, the damaged part 40 is illustrated as a curved line on the tire surface 31 of the tire side section 30.

The method of repairing the tire according to the present embodiment is applicable to a damage in which the damage part 40 has a relatively small defect of a rubber. Especially, it is suitably applicable when the damaged part 40 to be repaired is formed in an elongated shape on the tire surface 31 and a width of the damaged part 40 is narrow when viewed from the tire surface 31. For example, the method is suitably applied to a case where the damaged part 40 include the mutually opposing wall surfaces. Specifically, the method of repairing the tire is suitably applied to the damaged part 40 such as cut damage, crack, etc.

The shape of the damaged part 40 on the tire surface 31, such as an extending direction of the damaged part 40, is not particularly limited. The damaged part 40 may extend linearly, in a curved shape, in a zigzag shape, or a combination thereof within the tire surface 31. The damaged part 40 may extend on the tire surface 31 along a tire radial direction or the tire circumferential direction, or may extend to an inclined direction.

Figure 2A:
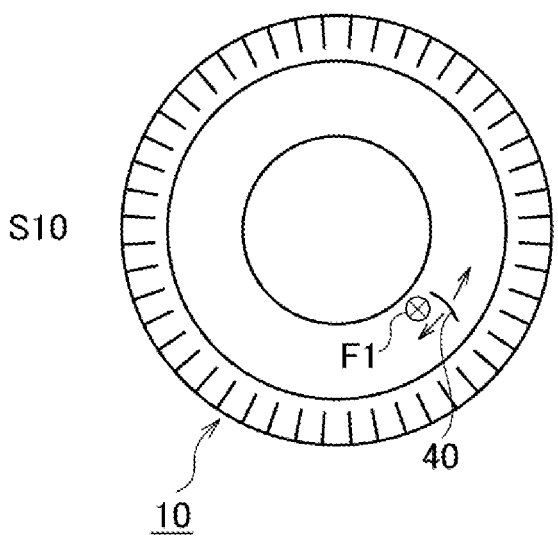
FIG. 2(a) is a schematic drawing of the tire 10 according to the embodiment illustrating a view from the tire axial direction, and is a drawing illustrating a step S10, the step of deforming a vicinity of the damaged part 40 of the tire 10 to open the damaged part 40.
Figure 2B:
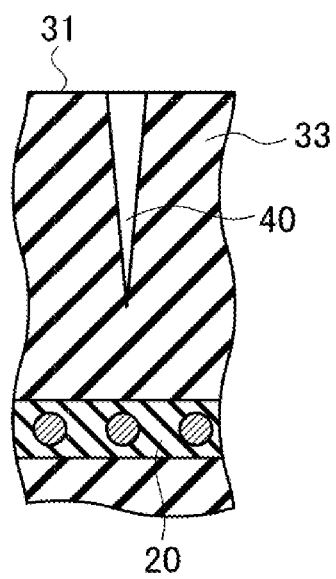
FIG. 2(b) is an enlarged cross-sectional view of a part including the damaged part 40 in an opened state in FIG. 2(a).
Figure 3A:
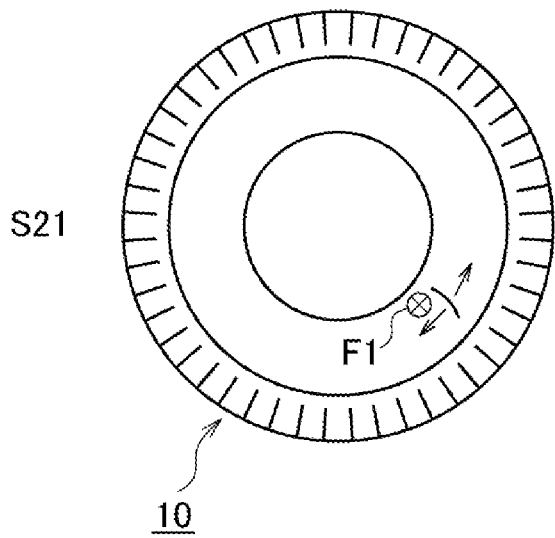
FIG. 3(a) is a schematic drawing of the tire 10 according to the embodiment illustrating a view from the tire axial direction, and is a drawing illustrating a state in which the damaged part 40 in the opened state is retained.
Figure 3B:
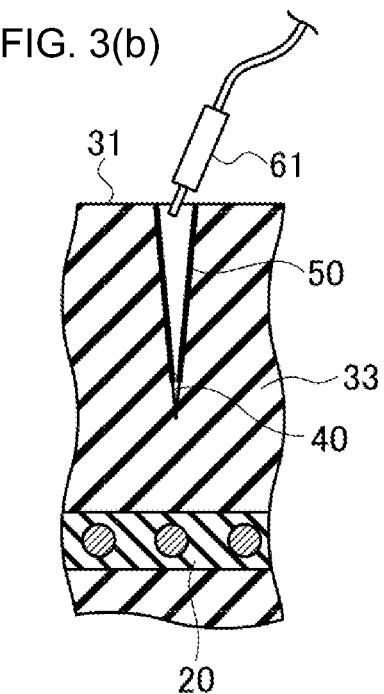
FIG. 3(b) is an enlarged cross-sectional view of a part including the damaged part 40, the drawing illustrating a step S21 of subjecting a surface treatment to the damaged part 40 in the opened state illustrated in FIG. 3(a).
Figure 3C:
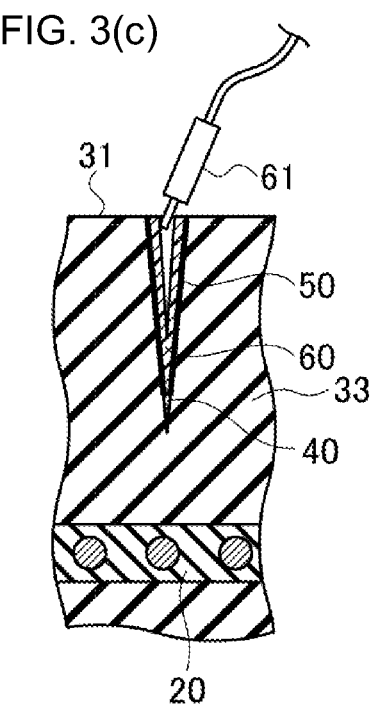
FIG. 3(c) is an enlarged cross-sectional view of a part including the damaged part 40, the drawing illustrating a step S23 of injecting or applying adhesive 60 to the damaged part 40 after being subjected to the surface treatment as illustrated in FIG. 3(b).

FIG. 2(a) is a schematic drawing of the tire 10 according to the present embodiment illustrating a view from the tire axial direction, and is a view illustrating the step S10 of deforming a vicinity of the damaged part 40 of the tire 10 to open the damaged part 40. FIG. 2(b) is an enlarged cross-sectional view of a part including the damaged part 40 in the opened state of FIG. 2(a). FIG. 3(a) is a schematic drawing of the tire 10 according to the present embodiment illustrating a view from the tire axial direction, and is a drawing illustrating a condition in which the damaged part 40 is retained in the opened state. FIGS. 3(b) and 3(c) illustrates a step S20 of bonding the damaged part 40. The step S20 of bonding the damaged part 40 includes a step S21 of applying a surface treatment to the damaged part 40 and a step S23 of injecting or applying an adhesive 60 to the damaged part 40. FIG. 3(b) is an enlarged cross-sectional view of a part including the damaged part 40 illustrating the step S21 of applying a surface treatment to the damaged part 40 being in the opened state illustrated in FIG. 3(a). FIG. 3(c) is an enlarged cross-sectional view of a part including the damaged part 40 illustrating the step S23 of injecting or applying adhesive 60 to the damaged part 40 after being subjected to the surface treatment illustrated in FIG. 3(b).

As illustrated in FIG. 2(a), the method of repairing the tire according to the present embodiment includes a first step S10 for opening the damaged part 40 while in the state the tire 10 is retained.

As illustrated in FIGS. 2(a) and 3(a), the state, in which the damaged part 40 according to the present embodiment is opened by deformation of the tire side section 30, is obtained by distorting the tire 10 with a pressing force F1 indicated in FIG. 2(a) applied in a direction from a plane of paper toward a back side so as to deform the damaged part 40 by pressing the vicinity of the damaged part 40.

Specifically, in the present embodiment, the damaged part 40 is opened by applying an uniaxial pressing force F1 to the tire side section 30 by applying the pressing force F1 between the tire side section 30 illustrated in the figure and the other tire side section (not illustrated) positioned on the opposite side in the tire width direction by a shackle vise (not illustrated), and the damaged part 40 is retained in the opened state.

However, the method of deforming the tire 10 to open the damaged part 40 is not limited the method described above. For example, the damaged part 40 may be opened by applying an uniaxial pressing force between a tire radial inner end and a tread surface at a tire circumferential position including the damaged part 40, and accordingly, by distorting the tire side section 30 to be convexed outward in the tire width direction.

Further, a part where the pressing force F1 is applied is not limited to the position illustrated in FIG. 2(a). The part to which the pressing force F1 is applied may be a position where the deformation of the tire side section 30 caused by the pressing force F1 affects the damaged part 40 and where the damaged part 40 is caused to be opened to the tire surface 31 and retained in the opened state.

As illustrated in FIGS. 3(a) to 3(c), the method of repairing the tire according to the present embodiment includes a second step S20 of injecting or applying an adhesive 60 to the damaged part 40.

As illustrated in FIG. 3(c), in the present embodiment, the adhesive 60 is applied by the adhesive applicator 61 to each of the mutually opposing wall surfaces of the damaged part 40. The means of providing the adhesive 60 to the damaged part 40 is not limited to application. For example, if the viscosity of the adhesive 60 is low, the adhesive 60 may be injected into the damaged part 40 for dropping.

As illustrated in FIG. 3(c), the adhesive 60 may not be injected or applied to the tip end of the damaged part 40. The adhesive applicator 61 may be selected from known injector or applicator in accordance with the shape, opening condition, etc., of the damaged part 40.

The adhesive 60 used herein may be, for example, one or more adhesives selected from the group consisting of an acrylic resin adhesive, an epoxy resin adhesive, a urethane resin adhesive, and a cyanoacrylate adhesive.

When the defect of the rubber in the damaged part 40 is relatively small, the damaged part 40 may be repaired by an acrylic resin adhesive, an epoxy resin adhesive or the like. When the damaged part 40 is repaired by an adhesive 60 such as an acrylic resin adhesive or an epoxy resin adhesive having a high elastic modulus after being cured, the tire 10 after being repaired is repaired to a state close to the state of the tire before being damaged and the repaired part may be prevented from being damaged again. Thus, a life of the tire 10 can be extended.

When the damaged part 40 is damaged with the defect of the rubber with a relatively large defect, the damaged part 40 may be repaired with a urethane resin adhesive or the like. When the damaged part 40 is repaired by an adhesive 60 such as a urethane resin adhesive having a low elastic modulus after being cured than an acrylic resin adhesive, an epoxy resin adhesive or the like, the adhesive 60 after being cured may be easily deformed in association with the surrounding rubber material forming the tire side section 30, so that the repaired part may be prevented from being damaged again. Thus, a life of the tire 10 can be extended.

The elastic modulus of the adhesive 60 after being cured is preferably 4.0 MPa or higher and 500 MPa or lower at 25° C. and 1.0 MPa or higher and 300 MPa or lower at 60° C. When the elastic modulus of the adhesive 60 after being cured is 4.0 MPa or higher at 25° C. and 1.0 MPa or higher at 60° C., sufficient peeling strength can be obtained. When the elastic modulus of the adhesive 60 after being cured is set to 500 MPa or lower at 25° C. and 300 MPa or lower at 60° C., the adhesive 60 sufficiently deforms in accordance with the deformation of the tire and cracking of the adhesive 60 may be suppressed.

In the present embodiment, in order to increase the adhesive force of the adhesive 60, foreign matter or the like is removed from the damaged part 40 in advance before the step S23 of injecting or applying the adhesive 60 illustrated in FIG. 3(c). In order to increase the adhesive force of the adhesive 60, as illustrated in FIG. 3(b), a surface treatment is applied to an area where the adhesive 60 is applied in the damaged part 40 from which the foreign matter has been removed. The surface roughness within the damaged part 40 may be adjusted prior to surface treatment by buffing the surface within the damaged part 40 or the like.

In the present embodiment, the surface of the damaged part 40 is treated by applying a primer 50 with a primer applicator 51. However, the method of surface treatment is not limited thereto. For example, corona treatment, plasma treatment, ultraviolet treatment, flame treatment, buffing, and the like may be applied as physical methods, and silane coupling treatment, graft treatment, and the like may be applied as chemical methods.

When the primer 50 is used for the surface treatment, the primer 50 may improve the adhesive force of the adhesive 60, and, further, may impart functions such as surface stabilization by the surface treatment and prevention of deterioration of the adhesive 60. Therefore, the surface treatment by the primer 50 is preferable as a surface treatment method used in the present embodiment.

The primer 50 used for the surface treatment may be, for example, an aqueous solution of hypochlorous acid. Specifically, it is preferable that the aqueous solution of hypochlorous acid has an effective chlorine concentration of 100 ppm or higher and 13000 ppm or lower and a pH value of 2 or higher and 7 or lower. The pH value is preferably in the range of 4 or higher and 7 or lower. When the hypochlorous acid aqueous solution is used as the primer 50, the wettability of the adhesive 60 to a rubber surface is improved by chlorinating the adhesion surface of the rubber. Thus, the adhesive strength of the adhesive 60 can be increased. When the pH value of the hypochlorous acid aqueous solution is in the range of 4 or higher and 7 or lower, the adhesive strength of the adhesive 60 is further improved.

A concentration of the secondary amine antioxidant in the rubber is preferably 1% or less on the adhesion surface of the rubber to which the primer 50 is applied. When the concentration of the secondary amine antioxidant in the rubber is 1% or less, the concentration of the antioxidant in the vicinity of an adhesion interface becomes sufficiently low and improves the peeling strength.

At the adhesion interface of the rubber subjected to chlorination treatment by a hypochlorous acid aqueous solution or the like as the surface treatment, the amount of the halogen element at a rubber-side position 1 μm from the adhesion interface is 300% or more of the amount of the halogen element at a rubber-side position 15 μm from the adhesion interface. When the amount of the halogen element at the adhesion interface of the rubber satisfies the above described relationship, the halogen element hardly reaches a position on the rubber-side position 15 μm from the interface. Therefore, it is possible to suppress reduction of strength at the repaired part caused by structural change of the rubber associated with hardening of the rubber.

When the halogen element reaches a rubber-side position of about 4 μm to 5 μm from the adhesive interface while satisfying the above described relationship at the adhesive interface of the rubber, the adhesive strength of the adhesive 60 may further increase.

Figure 4A:
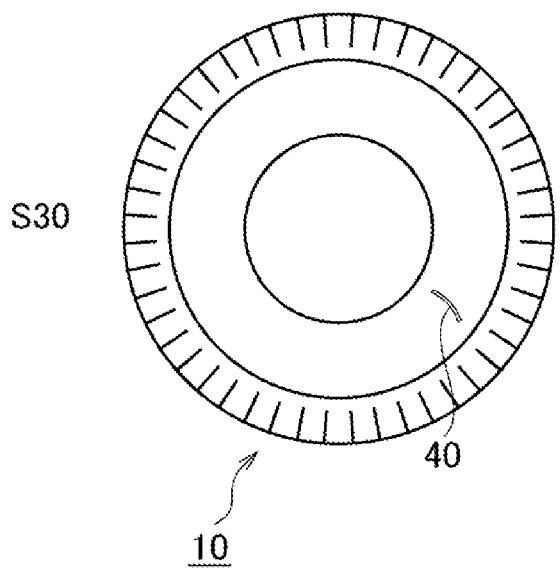
FIG. 4(a) is a schematic drawing of the tire 10 according to the embodiment illustrating a view from the tire axial direction, and is a drawing illustrating a step S30 in which the damaged part 40 is released from the deformed state and the damaged part 40 is bonded and repaired.
Figure 4B:
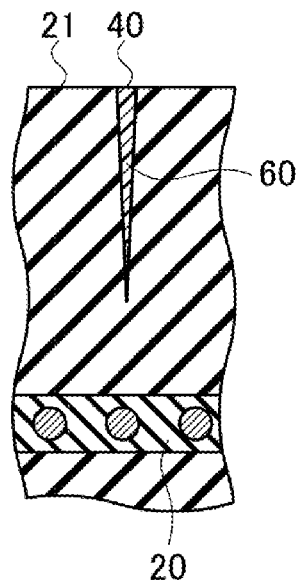
FIG. 4(b) is a cross-sectional view of a state illustrating the damaged part 40 in FIG. 4(a) being released from the deformed state and wall surfaces of the damaged part 40 being bonded.

FIG. 4(a) is a schematic drawing of the tire 10 according to the present embodiment illustrating a view from the tire axial direction, and is a view illustrating a step S30 in which the damaged part 40 is adhered and repaired by removing the deformation of the damaged part 40. FIG. 4(b) is a cross-sectional view illustrating a state in which the deformation of the damaged part 40 is removed and the wall surfaces of the damaged part 40 is adhered as illustrated in FIG. 4(a).

As illustrated in FIGS. 4(a) and 4(b), the method of repairing the tire according to the present embodiment includes a third step S30 in which the damaged part 40 is released from the opened state and the mutually opposing wall surfaces of the damaged part 40 are bonded.

In the repaired tire 10 after the third step S30, the damaged part 40 is in a repaired state by the cured adhesive 60. If the width of the damaged part 40 is narrow, a thickness of the adhesive 60 after being cured may be as thin as possible to maintain a bonded state.

Variant 1

In the present embodiment, the opened state, in which the damaged part 40 is opened, caused by the first step S10 is released in the third step S30, whereby the mutually opposing wall surfaces of the damaged part 40 are bonded.

However, the method of bonding the wall surfaces of the damaged part 40 is not limited thereto.

Figure 5A:
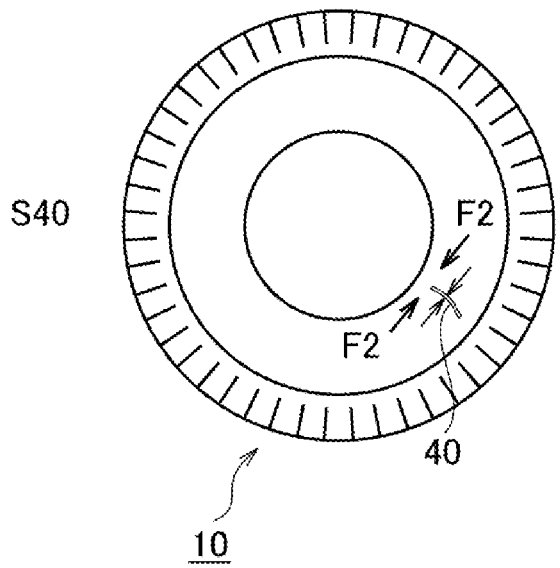
FIG. 5(a) is a schematic drawing of the tire 10 according to a variant illustrating a view from the tire axial direction, and is a drawing illustrating a step S40 in which the damaged part 40 is bonded and repaired in a state pressed with a pressing force F2 applied to a vicinity of the damaged part 40 so as the mutually opposing wall surfaces of the damaged part 40 of the tire 10 to move closer to each other.
Figure 5B:
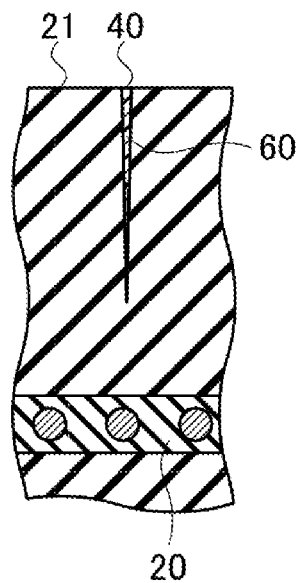
FIG. 5(b) is a cross-sectional view illustrating a state in which the wall surfaces of the damaged part 40 is bonded in a state in which a layer of the adhesive 60 in FIG. 5(a) is thinner than a layer of the adhesive in FIG. 4(b).

For example, a step of bonding the damaged part 40 may further include a fourth step S40 in which the mutually opposing wall surfaces of the damaged part 40 illustrated in FIG. 5(*a*) are pressed to move closer to each other after the damaged part 40 is released from the opened state in the third step S30. The fourth step S40 is applied to the damaged part 40 after the third step S30 and before curing of the adhesive 60 is completed.

In the fourth step S40, a pressing force F2 may be applied to the vicinity of the wall surfaces of the damaged part 40 in a direction in which the wall surfaces of the damaged part 40 oppose each other or in a direction crossing the direction in which the damaged part 40 extends. The direction in which the wall surfaces of the damaged part 40 oppose each other or the direction crossing the direction in which the damaged part 40 extend is direction of the pressing force F2 selected so as to reduce the thickness of a layer of the adhesive 60 after being cured. The pressing force F2 is preferably 10 kPa or more.

When it is difficult to apply the pressing force in the direction in which the wall surfaces of the damaged part 40 oppose each other, the wall surfaces of the damaged part 40 may be deformed by pressing the damaged part 40 along a depth direction of the damaged part 40 to bring the wall surfaces of the damaged part 40 to move closer to each other.

Variant 2

In the present embodiment, as a means for performing the first step S10 of opening the damaged part 40 and the third step S30 of releasing the damaged part 40 from the opened state, a squash vise is employed to apply pressing force to the damaged part 40 and to release the pressing force from the damaged part 40. However, the means for opening the damaged part 40 and releasing the damaged part 40 from the opened state is not limited thereto.

For example, the first step S10 of opening the damaged part 40 and the third step S30 of releasing the damaged part 40 from the opened state may be steps performed by applying and releasing a pressing force to the damaged part 40 with a ground contact pressure of the tire 10, the tire 10 being in a state mounted to the vehicle.

Specifically, in the first step S10 of opening the damaged part 40, the tire 10 mounted to the vehicle may be rolled to and retained in a state placing the damaged part 40 at a position in the tire radial direction between a tire center axis and a ground contact area, thereby deforming the tire side section 30 by the ground contact pressure to open the damaged part 40.

In the third step S30 of releasing the opened state of the damaged part 40, the tire 10 after injecting or applying the adhesive 60 to the damaged part 40 may be further rolled so as to bond the damaged part 40 by the adhesive 60 by removing the deformation of the tire side section 30 caused by the ground contact pressure, thereby retaining the damaged part 40 in a closed state.

Action/Effect

The method of repairing the tire according to this embodiment is the method of repairing the damaged part 40 terminated in the rubber layer 33 formed in a part positioned between the carcass ply 20 and the tire surface 31 in the tire side section 30. The method of repairing the tire includes the first step S10 of opening the damaged part 40 while in the state the tire 10 is retained, the second step S20 of injecting or applying the adhesive 60 to the damaged part 40, and the third step S30 of releasing the damaged-part-opened state and bonding mutually opposing wall surfaces of the damaged part 40.

Therefore, according to the method of repairing the tire according to the present embodiment, the damaged part 40 of the rubber layer 33 in the tire side section 30 of the tire 10 may be easily repaired. Further, by further use of the tire 10, extension of the damaged part 40 toward inside of the tire can be suppressed, and the life of the tire can be extended. Further, since the repair is performed at a timing before the damaged part 40 reaches the carcass ply 20, the repair can be performed before the tire is in a state difficult to repair unlike a case where a tire repairing work is performed after the damaged part 40 has reached the carcass ply 20. Thus, the life of the tire can be further extended.

When the adhesive 60 injected or applied to the damaged part 40 does not reach the tip, further extension of the crack of the damaged part 40 can be prevented by an influence of the step of applying the adhesive 60.

Further, when the fourth step S40, in which the mutually opposing wall surfaces of the damaged part 40 are pressed to move closer to each other after the damaged part 40 is released from the opened state in the third step S30, is further performed, as illustrated in FIG. 5(*b*), the wall surfaces of the damaged part 40 may come close to each other and the thickness of the layer of the adhesive 60 after being cured may become thinner than the thickness of the layer of the adhesive 60 in a state illustrated in FIG. 4(*b*). Therefore, according to the method of the fourth step S40, it is possible to prevent an occurrence of breakage in the layer of the adhesive 60.

This application claims priority under Japanese patent application 2019-227904, filed Dec. 18, 2019, the entire contents of which are incorporated herein by reference.

Although embodiments of the invention have been described, it should not be understood that the arguments and drawings forming part of this disclosure limit the invention. Various alternative embodiments, embodiments, and operational techniques will be apparent to those skilled in the art from this disclosure.

The invention claimed is:

1. A method of repairing a tire, the method being a method to repair a damaged part of the tire, the damaged part being a part in a rubber layer of a tire side section located between a carcass ply and a tire surface and being terminated within the rubber layer, the method comprising:
    a first step of opening the damaged part by deformation of the tire side section while in a state the tire is retained, the deformation being made by applying a pressing force to the damaged part with a ground contact pressure of the tire;
    a second step of injecting or applying an adhesive to the damaged part; and
    a third step of releasing an opened state of the damaged part made open in the first step to bond mutually opposing wall surfaces of the damaged part.

2. The method of repairing the tire according to claim 1, wherein
    the adhesive is not injected nor applied to a tip end of the damaged part.

3. The method of repairing the tire according to claim 1, wherein
    the mutually opposing wall surfaces in the damaged part is subjected to a surface treatment before the adhesive is applied.

4. The method of repairing the tire according to claim 3, wherein
   the surface treatment is performed with a primer.

5. The method of repairing the tire according to claim 1, the method further comprising:
   a fourth step of pressing the mutually opposing wall surfaces bonded in the third step to move closer to each other.

6. The method of repairing the tire according to claim 1, wherein
   the first step is performed by rolling the tire mounted to a vehicle to open the damaged part with the ground contact pressure by holding the tire in a state where the damaged part is placed between the tire center axis and the ground contact area, and
   the third step is performed by rolling the tire after injecting or applying the adhesive to bond the damaged part by keeping the damaged part in a state where the damaged part is released from the ground contact pressure.

7. The method of repairing the tire according to claim 1, wherein
   the adhesive is one or more adhesives selected from the group consisting of an acrylic resin adhesive, a urethane resin adhesive and an epoxy resin adhesive.

* * * * *